US009298249B2

(12) United States Patent
Geissler et al.

(10) Patent No.: US 9,298,249 B2
(45) Date of Patent: *Mar. 29, 2016

(54) PARTITION LEVEL POWER MANAGEMENT USING FULLY ASYNCHRONOUS CORES WITH SOFTWARE THAT HAS LIMITED ASYNCHRONOUS SUPPORT

(71) Applicant: International Business Machines Corporation, Armonk, NY (US)

(72) Inventors: Andrew Geissler, Austin, TX (US); Raymond J. Harrington, Poughkeepsie, NY (US); Hye-Young McCreary, Austin, TX (US); Freeman Leigh Rawson, III, Austin, TX (US); Malcolm Scott Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 13/793,500

(22) Filed: Mar. 11, 2013

(65) Prior Publication Data

US 2013/0212415 A1 Aug. 15, 2013

Related U.S. Application Data

(63) Continuation of application No. 12/544,541, filed on Aug. 20, 2009, now Pat. No. 8,452,991.

(51) Int. Cl.
*G06F 1/32* (2006.01)
*G06F 9/50* (2006.01)

(52) U.S. Cl.
CPC .............. *G06F 1/324* (2013.01); *G06F 9/5061* (2013.01); *G06F 9/5094* (2013.01); *Y02B 60/1217* (2013.01); *Y02B 60/142* (2013.01)

(58) Field of Classification Search
CPC ........................................................ G06F 1/324
USPC ........................................................ 713/300
See application file for complete search history.

(56) References Cited

U.S. PATENT DOCUMENTS 6,711,447 B1 * 3/2004 Saeed ............................ 700/82
6,711,691 B1 3/2004 Howard et al. ............... 713/300
(Continued)

OTHER PUBLICATIONS

Magklis, G. et al., "Profile-based Dynamic Voltage and Frequency Scaling for a Multiple Clock Domain Microprocessor," ACM Digital Library, Proceedings of the 30th Annual International Symposium on Computer Architecture, Jun. 2003, pp. 14-25.
(Continued)

*Primary Examiner* — Jaweed A Abbaszadeh
*Assistant Examiner* — Alyaa T Mazyad
(74) *Attorney, Agent, or Firm* — Van Leeuwen & Van Leeuwen; Parashos Kalaitzis

(57) ABSTRACT

A partition that is executed by multiple processing nodes. Each node includes multiple cores and each of the cores has a frequency that can be set. A first frequency range is provided to the cores. Each core, when executing the identified partition, sets its frequency within the first frequency range. Frequency metrics are gathered from the cores running the partition by the nodes. The gathered frequency metrics are received and analyzed by a hypervisor that determines a second frequency range to use for the partition, with the second frequency range being different from the first frequency range. The second frequency range is provided to the cores at the nodes executing the identified partition. When the cores execute the identified partition, they use a frequencies within the second frequency range.

17 Claims, 7 Drawing Sheets

(56) References Cited

U.S. PATENT DOCUMENTS

| | | | |
|---|---|---|---|
| 7,171,568 B2 | 1/2007 | Dayan et al. | 713/300 |
| 8,250,395 B2* | 8/2012 | Carter et al. | 713/322 |
| 2007/0150893 A1* | 6/2007 | Grobman | 718/1 |
| 2009/0150896 A1* | 6/2009 | Tsushima et al. | 718/104 |
| 2009/0187777 A1* | 7/2009 | Clark | 713/320 |
| 2009/0235099 A1 | 9/2009 | Branover et al. | 713/322 |
| 2009/0271646 A1 | 10/2009 | Talwar et al. | 713/322 |
| 2009/0319759 A1 | 12/2009 | Rothman et al. | 712/223 |
| 2011/0022857 A1* | 1/2011 | Nussbaum et al. | 713/300 |
| 2011/0022870 A1 | 1/2011 | McGrane et al. | 713/340 |

OTHER PUBLICATIONS

He, G. et al., "A Framework for Time Indexing in Sensor Networks," ACM Digital Library, ACM Transactions on Sensor Networks, vol. 1, No. 1, Aug. 1005, pp. 101-133.

* cited by examiner

US 9,298,249 B2

PARTITION LEVEL POWER MANAGEMENT USING FULLY ASYNCHRONOUS CORES WITH SOFTWARE THAT HAS LIMITED ASYNCHRONOUS SUPPORT

TECHNICAL FIELD

The present invention relates to managing power of asynchronous processing cores that are running a common software partition. More particularly, the present invention relates to providing a frequency range among the asynchronous cores while running the partition.

BACKGROUND OF THE INVENTION

Modern computer systems sometimes include processing nodes that, in turn, include multiple processing cores that execute instructions. In some environments, these processing cores are asynchronous both in terms of the executions that are processed as well as the speed, or frequency, at which the cores run. While running asynchronous cores is advantageous in terms of managing environmental factors, such as heat, they cause challenges in certain computing environments. One environment where asynchronous cores cause challenges is when running software partitions that span multiple nodes and multiple cores. A software application, such as a large application or an operating system, can often be configured to span multiple nodes and cores, but software errors often occur when these cores run at vastly different frequencies.

SUMMARY

An approach is provided that identifies a partition that is executed by multiple processing nodes running on the information handling system. Each of the processing nodes include a multiple processing cores and each of the processing cores has a frequency that can be set to a particular value. The approach provides a first frequency range to each of the processing cores at each of the processing nodes. The first frequency range indicates a first maximum frequency value and a first minimum frequency value. Each of the processing cores, when executing the identified partition, sets its frequency to a first value that is within the first frequency range. Frequency metrics are gathered from the processing cores running the partition by the processing nodes. The gathered frequency metrics are received and analyzed by a hypervisor that determines a second frequency range to use for the partition, with the second frequency range being different from the first frequency range. The second frequency range is provided to each of the processing cores at each of the processing nodes that is executing the identified partition. Now, when the processing cores execute the identified partition, they set their core frequencies within the second frequency range.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
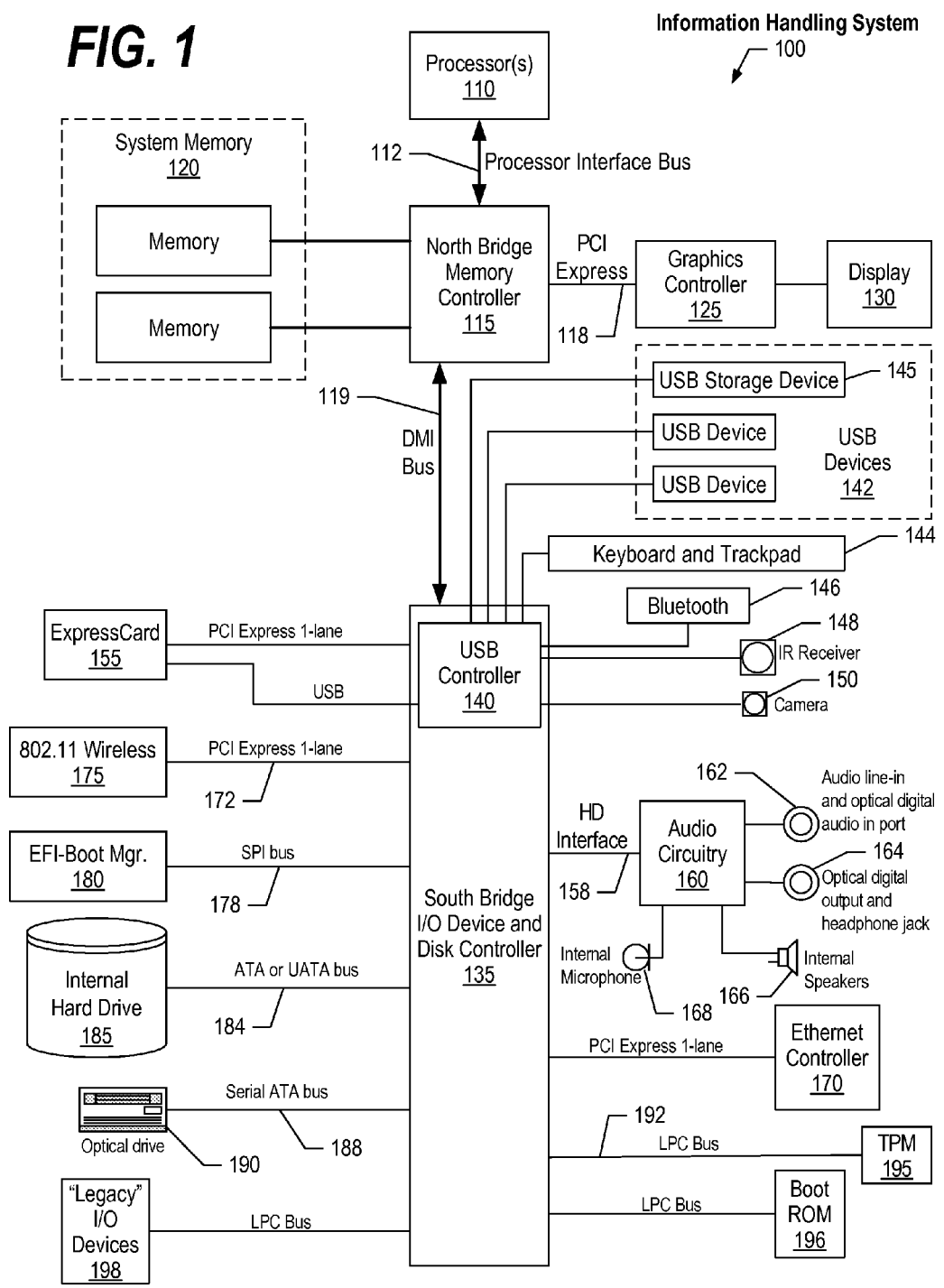
FIG. 1 is a block diagram of a data processing system in which the methods described herein can be implemented.
Figure 2:
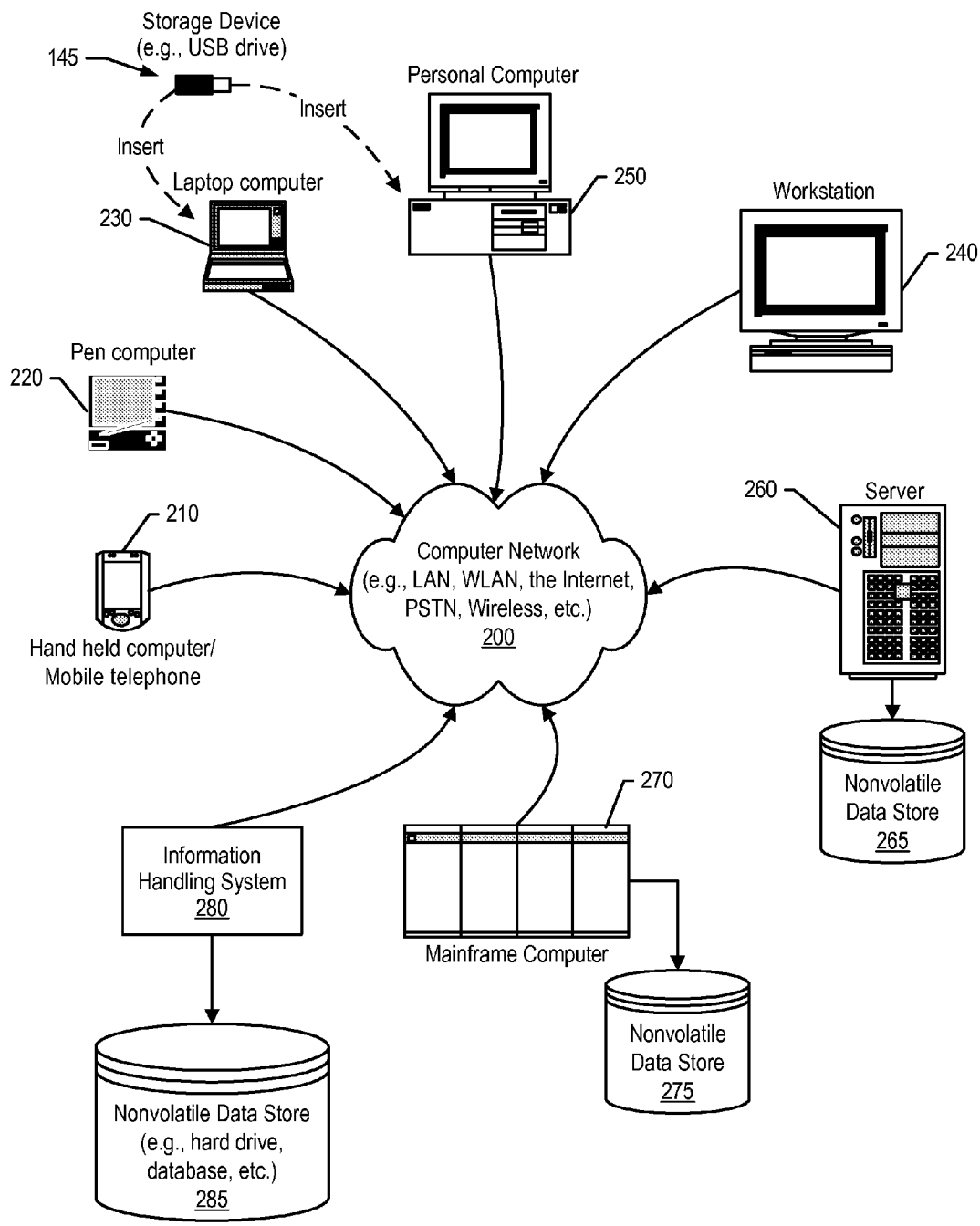
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
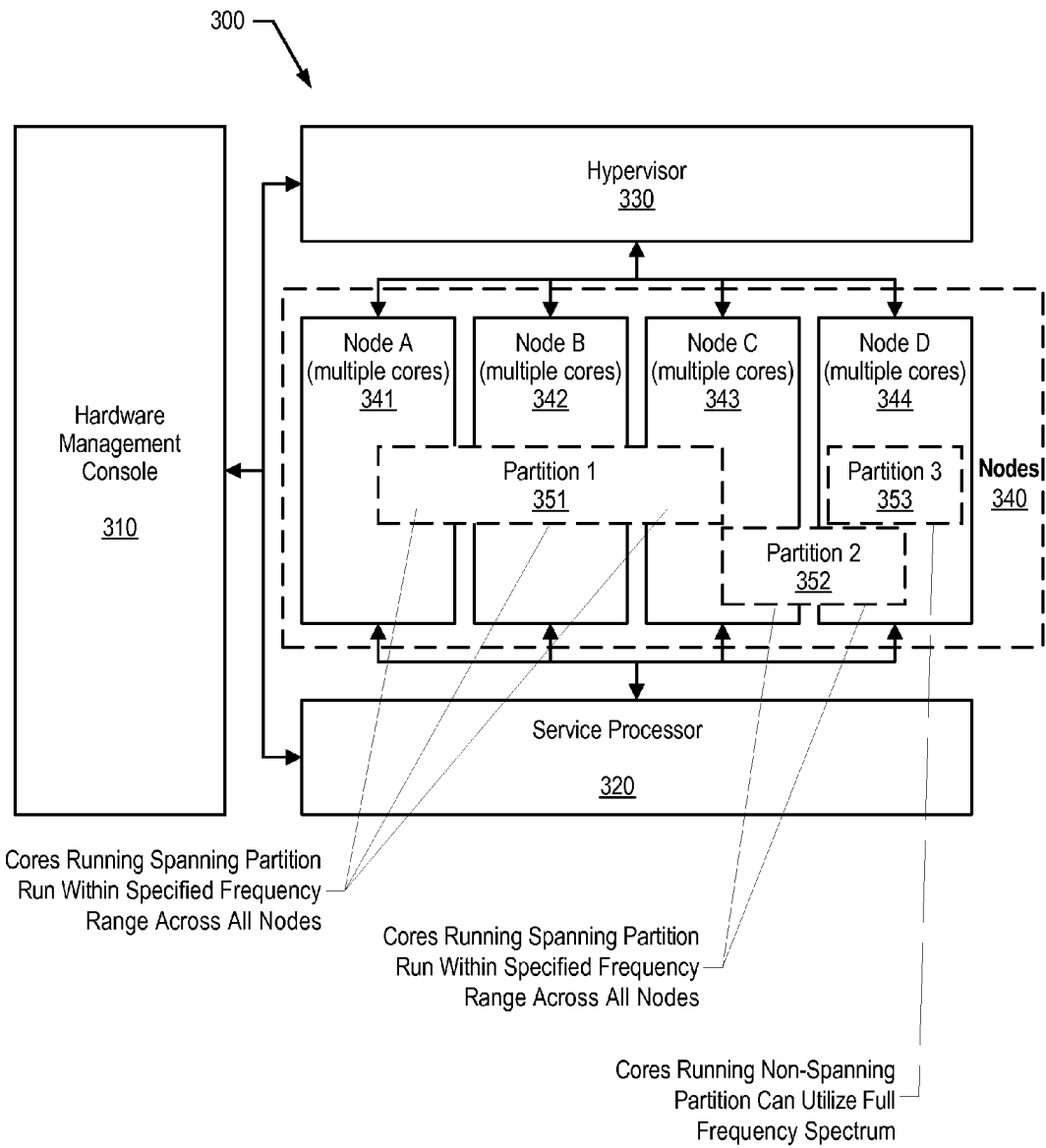
FIG. 3 is a diagram showing components of a multi-core information handling system executing various partitions.

FIG. 3 is a diagram showing components of a multi-core information handling system executing various partitions. Information handling system 300 includes hardware management console 310, service processor 320, hypervisor 330, and processing nodes 340. In the system shown, four processing nodes are shown (Node A 341, Node B 342, Node C 343, and Node D 344). However, as will be appreciated by those skilled in the art, a different amount of nodes can be included in a multi-node system. Likewise, each of the nodes includes a plurality of processing cores (e.g., processors). Those skilled in the art will also appreciate that each of the nodes can have multiple processing cores. In the example shown, three software partitions are executing on the information handling system: Partition 1 (351), Partition 2 (352), and Partition 3 (353). Two of the partitions are node-spanning partitions which means that they execute on more than one node. In the example shown, Partition 1 (351) is shown spanning Nodes A through C and Partition 2 is shown spanning Nodes C and D. One partition (Partition 3 (353)) is a single-node partition and executes within a single node (Node D (354)).

Each individual core can be run at a different frequency than other cores in the system. Supporting asynchronous core frequencies can be a challenge to the various partitions, such as an operating system that executes as a partition and well as to the software applications running on these operating systems. Many software applications, such as operating systems, were not designed to support having cores within it running at different frequencies. There is a concern that running cores at different frequencies may cause unplanned failures within the operating systems and/or the software applications running within the operating system.

One approach to addressing this concern is to simply run all cores within a system at the same frequency. However, this approach does not allow for exploitation of the dynamic power savings achieved by adjusting individual cores frequencies based on core utilization. In addition, this approach does not allow the user to set different power management policies per partition. Another approach is to not span partitions across nodes. Of course, this approach limits the advantage of having multiple nodes. This is especially true in large software applications, such as complex operating systems, that benefit by being spread across multiple nodes.

In the approach described herein, the frequency of each core that is running a particular partition is kept within a particular range of frequencies. In one embodiment, the service processor communicates the initial frequency to each of the nodes in the system. The nodes are allowed to adjust the frequencies of individual nodes that are running the partition within a provided range (e.g., within 10% of the provided frequency). Frequency metrics are maintained by the nodes indicating how often the node's cores that are running a given partition run at the maximum allowed frequency within the provided range and how often such cores run at the minimum allowed frequency within the provided range. In one embodiment, these metrics are provided to the hypervisor which, in turn, decides whether the base frequency used to execute the partition should be increased or decreased.

For example, using the example partitions shown in FIG. 3, assume that each core has a nominal frequency of 4.0 GHz and that each node is instructed to first set the frequency used to execute Partition 1 and Partition 2 to 80% of nominal (3.2 GHz) with an allowed range of 10% greater than the set frequency. Now, each node can adjust the frequency of cores used to execute the partition from 3.2 GHz to 3.6 GHz based on utilization. Further assume that Partition 1 has low utilization while Partition 2 has high utilization. In this case, the hypervisor will receive the metrics indicating Partition 1's low utilization and Partition 2's high utilization and can send out new base frequencies of 70% of nominal (2.8 GHz) for lower utilization Partition 1 and 90% of nominal (3.6 GHz) for higher utilization Partition 2. Now, using the 10% range, when a node's core(s) are executing Partition 1, the node can set the frequencies of these cores anywhere from 2.8 GHz to 3.2 GHz and be within the 10% range. Likewise, when a node's core(s) are executing Partition 2, the node can set the frequencies of these cores anywhere from 3.6 GHz to 4.0 GHz and be within the 10% range. In this manner, the hypervisor can repeatedly adjust the base frequencies to be used by the nodes when the nodes' cores are executing the various partitions. Because Partition 3 is not a node-spanning partition, the node executing Partition 3 (Node D), can adjust the frequency of the cores anywhere within the allowed frequency range of the core without having the hypervisor provide the base frequency to use. In addition, in one embodiment, the frequency range (e.g., the 10% range used in the example) can be different for different partitions so that one partition that is more finicky can be maintained within a tighter range (e.g., 5% rather than 10%) while a partition that was better designed for multi-core spanning might have a looser range (e.g., 15% rather than 10%).

Figure 4:
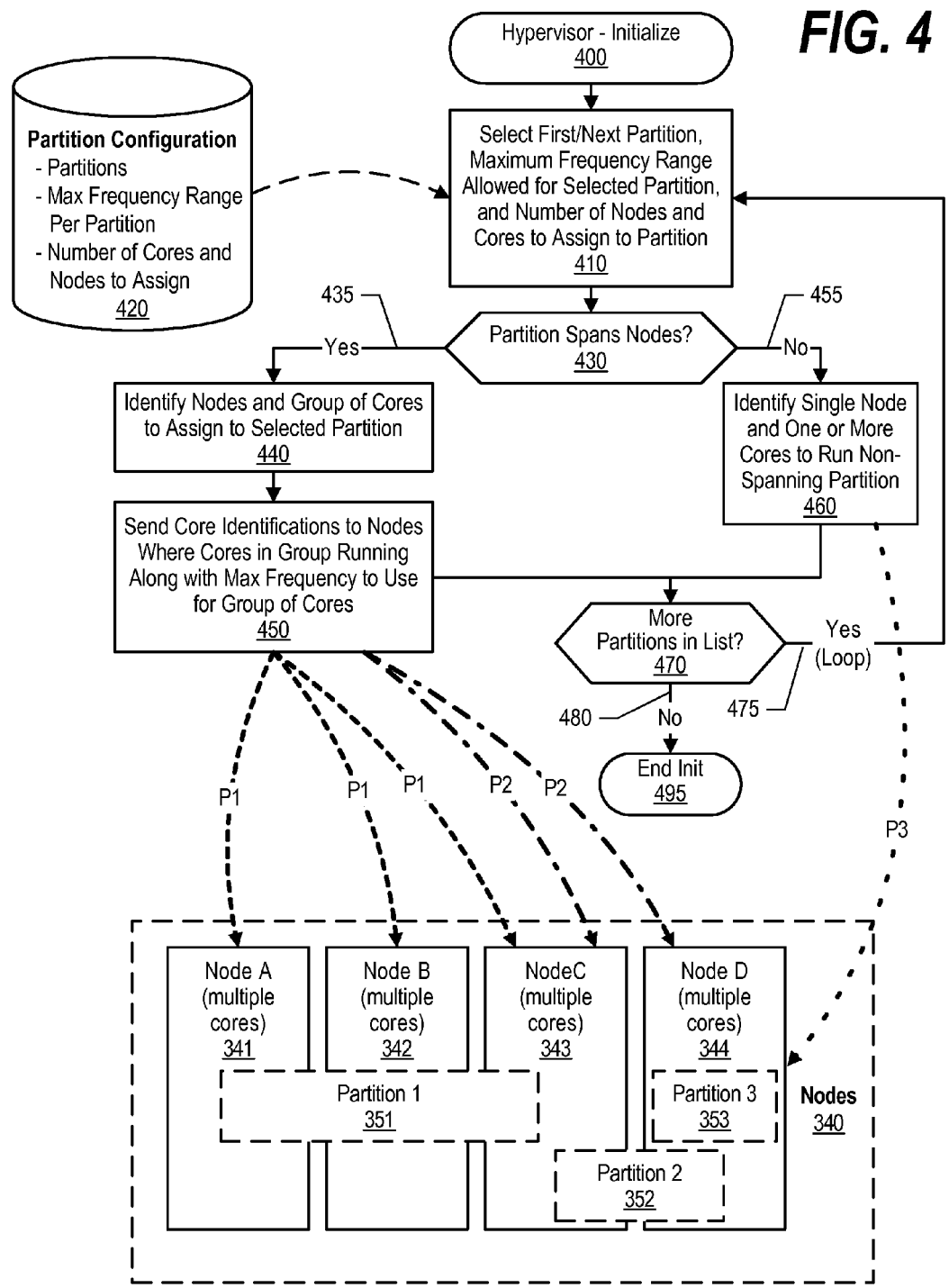
FIG. 4 is a flowchart showing the steps taken by the hypervisor to initialize execution of partitions on the multi-node system.

FIG. 4 is a flowchart showing the steps taken by the hypervisor to initialize execution of partitions on the multi-node system. Hypervisor processing commences at 400 whereupon, at step 410, the hypervisor selects the first partition from partition configuration data store 420. As shown, partition configuration data store 420 includes data regarding the partitions that are being executed on the computer system, the frequency range allowed per partition, and the number of processing nodes and the number of processing cores to assign to the partition.

A determination is made as to whether the selected partition is a multi-node spanning partition (decision 430). In other words, whether the selected partition executes on multiple nodes or on a single node. If the selected partition is a multi-node spanning partition, then decision 430 branches to "yes" branch 435 whereupon, at step 440, the hypervisor identifies the processing nodes and groups of processing cores to assign to the selected partition. At step 450, the hypervisor sends each of the identified nodes the core identifications (which cores on the node are assigned to the partition) as well as the frequency range (e.g., 10%, etc.) to use for the group of cores. Using the example from FIG. 3, Nodes A, B, and C would be sent data concerning the frequency range and cores assigned to execute Partition 1, and Nodes C and D would be sent data concerning the frequency range and cores assigned to execute Partition 2.

Returning to FIG. 4, decision 430, if the selected partition is not a multi-node spanning partition, then decision 430 branches to "no" branch 455 whereupon, at step 460, the hypervisor identifies a single node that will execute the non-spanning partition and one or more cores on the identified node that are assigned to the selected partition. Referring again to the example provided in FIG. 3, Partition 3 is a single-node partition, so at step 460, when processing Partition 3, the hypervisor sends the identified node (Node D) the assignment as well as the core(s) in Node D that are assigned to execute the partition. Note that in step 460, unlike step 450, the node is not provided a frequency range to use when executing the non-spanning partition, so the node (e.g., Node D) can set the frequency of the cores to any allowable frequency value based on the utilization of the core(s) in conjunction with any power management policies that have been implemented.

After a partition (multi-node or non-spanning) has been processed, a determination is made as to whether there are more partitions in partition configuration data store 420 to process (decision 480). If there are more partitions to process, then decision 470 branches to "yes" branch 475 which loops back to select the data for the next partition and process it accordingly. This looping continues until all the partitions have been selected and processed, at which point decision 470 branches to "no" branch 480 whereupon hypervisor initialization processing ends at 495.

Figure 5:
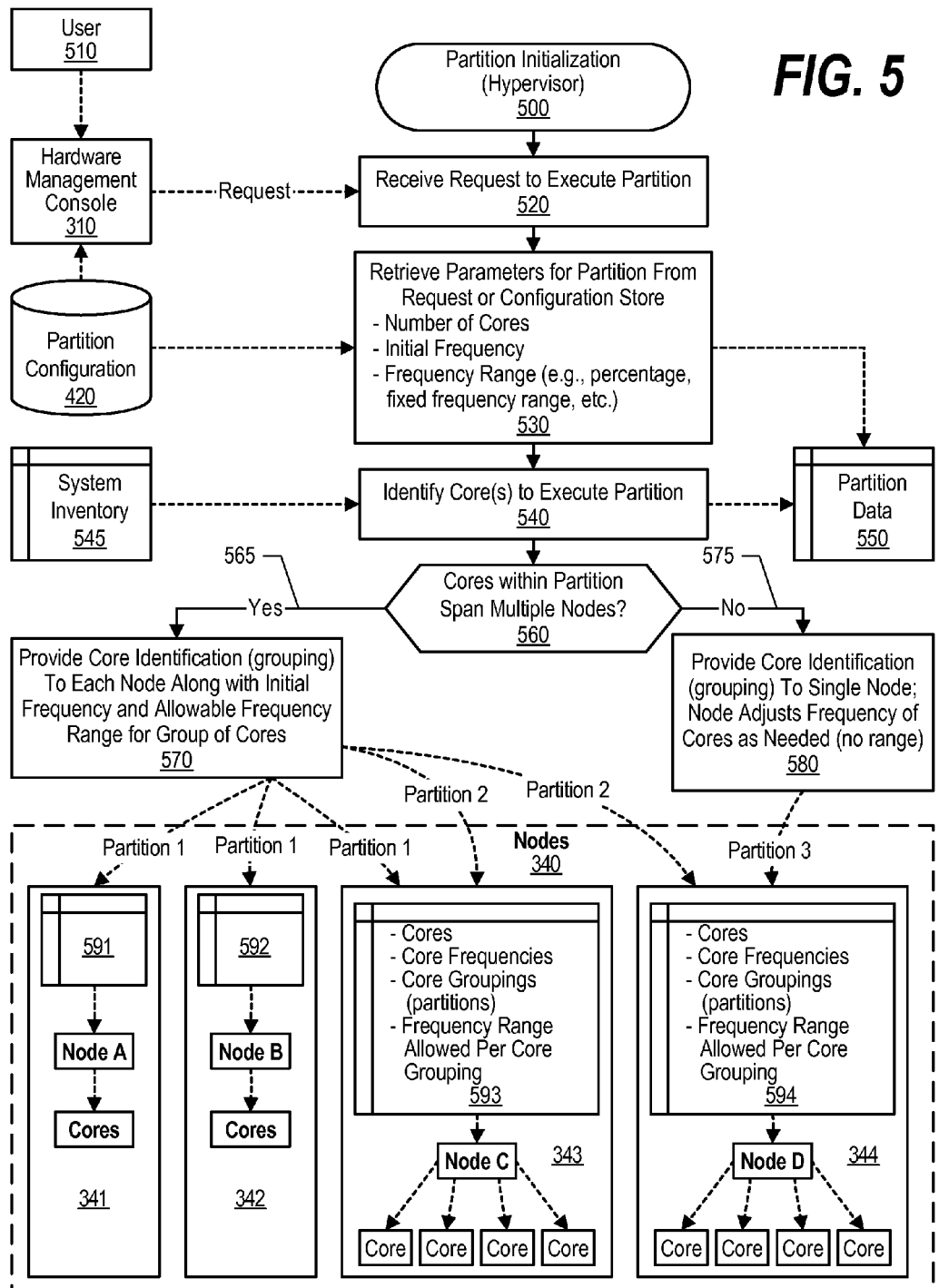
FIG. 5 is a flowchart showing steps taken by the hypervisor during partition initialization.

FIG. 5 is a flowchart showing steps taken by the hypervisor during partition initialization. Processing commences at 500 whereupon, at step 520, a request is received to execute one of the partitions. One way the request can be received is by user 510 using hardware management console 310 to select one of the partitions from partition configuration data store 420. At step 530, the hypervisor retrieves the parameters for executing the requested partition either from the request itself or by reading the data associated with the requested partition from partition configuration data store 420. The parameters corresponding to the requested partition may include the number of processing cores that the partition should utilize when executing, the initial frequency that should be used (e.g., 3.6 GHz, etc.), and the frequency range that should be enforced by all nodes when running the partition (e.g., 5%, 10%, etc.). The parameters used to execute the partition are stored in partition data store 550. At step 540, the hypervisor reads system inventory data store 545 that was performed during system startup that identifies the nodes and cores that are available and uses this data to identify the processing cores that are to be used to execute the partition. This data is written to partition data store 550.

A determination is made as to whether the processing cores that have been identified to execute the requested partition are within the same node or whether the identified cores span multiple nodes (decision 560). If the cores span multiple nodes, then decision 560 branches to "yes" branch 565 whereupon, at step 570, the hypervisor provides processing core identification (grouping information) to each of the nodes that have processing cores identified to execute the partition along with the initial frequency (e.g., 3.6 GHz, etc.) that each processing node sets for each of the processing cores when executing the requested partition as well as the allowable frequency range (e.g., 10%, etc.) within which the nodes are allowed to adjust the frequency of individual cores as previously described. Referring back to the example introduced in FIG. 3, data concerning Partition 1 would be distributed to Nodes A through C (341, 342, and 343), data concerning Partition 2 would be distributed to Nodes C and D (343 and 344). Each of the nodes has a memory (memory 591, 592, 593, and 594, respectively) that is used to store data regarding the cores, the core frequencies, core groupings (for partitions), and allowed frequency ranges. Note that each of the nodes A through D is essentially the same, however in FIG. 5, Nodes C and D (343 and 344) have been expanded to show additional detail such as the type of data stored in the memory and the individual processing cores.

Returning to decision 560, if the cores identified to execute the partition are all within the same node, then decision 560 branches to "no" branch 575 whereupon, at step 580 the core identification is sent to a single node (e.g., Node D (344) in the example for Partition 3). Because the processing cores are all within the same node, the node can adjust the frequency utilized by these cores as needed without having to be within an allowable frequency range. However, in one embodiment, to avoid software problems arising from differing core frequencies, all of the cores in the node that are executing the partition are set to the same frequency (e.g., 3.0 GHz, etc.). However, if the partition is greatly over- or under-utilizing the cores, the node can adjust the frequencies of all the cores without referencing the allowed frequency range (e.g., the node can bump up the frequencies of all the cores running Partition 3 from 3.0 GHz to 4.0 GHz where such increase would usually be outside the allowable range if the partition was multi-nodal).

Figure 6:
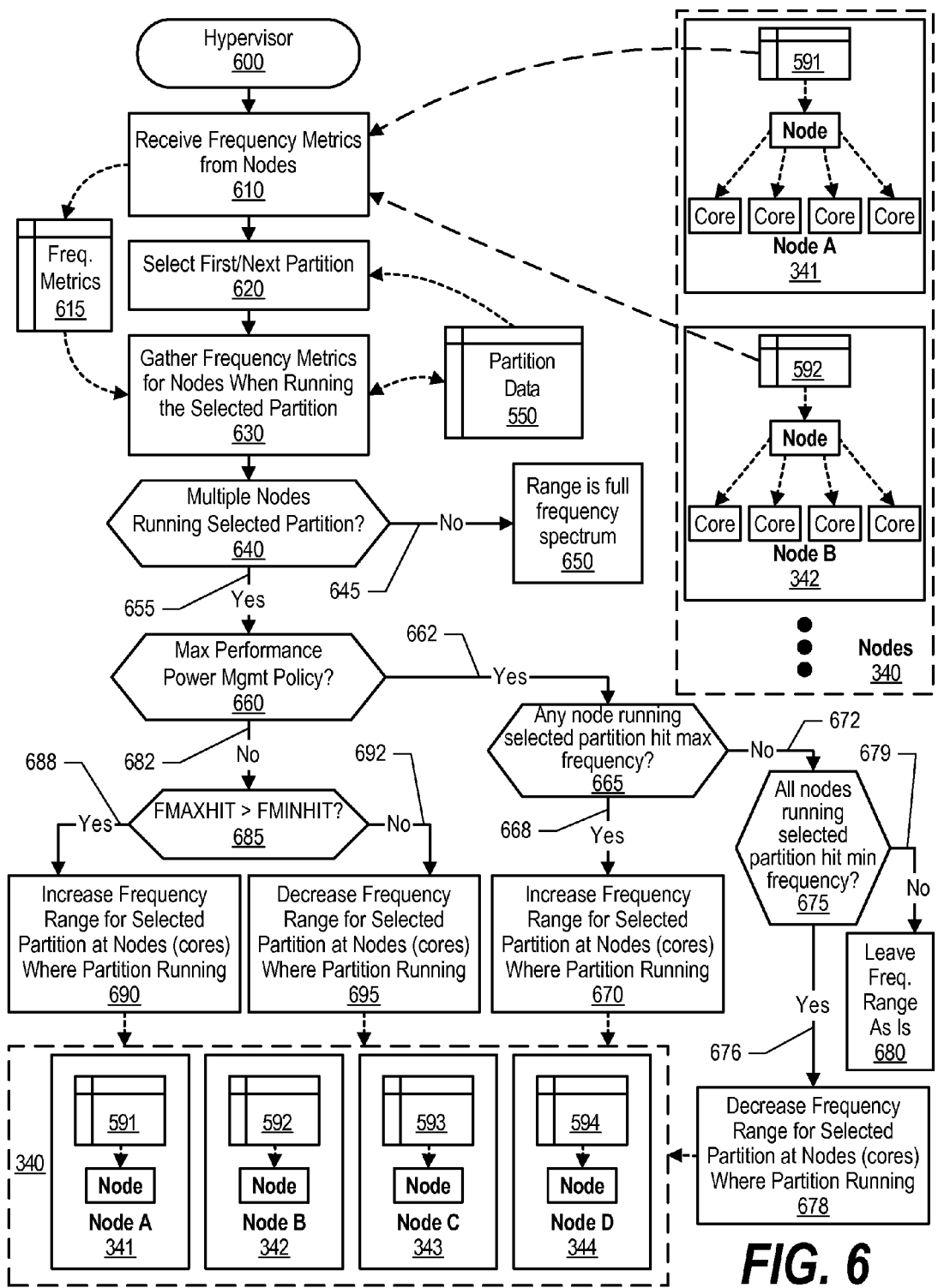
FIG. 6 is a flowchart showing steps taken by the hypervisor to manage a power management policy by altering the frequency ranges for processing cores based upon utilization.

FIG. 6 is a flowchart showing steps taken by the hypervisor to manage a power management policy by altering the frequency ranges for processing cores based upon utilization. Processing commences at 600 whereupon, at step 610, the hypervisor receives frequency metrics from processing nodes 340 and stores the data in frequency metrics memory area 615. These frequency metrics indicate how often the cores in the various nodes were running at the minimum frequency within the range and how often the cores in the nodes were running at the maximum frequency within the frequency range.

For example, if a partition's base frequency was set at 90% of a nominal 4.0 GHz frequency with a 10% allowable frequency range, the allowable frequencies for any node running the partition would be from 3.6 GHz to 4.0 GHz. If the cores within a node routinely hit the minimum allowed frequency in the range (3.6 GHz), then it may be advantageous to decrease the base frequency (e.g., from 3.6 GHz to 3.2 GHz so the new range would be 3.2 GHz to 3.6 GHz, etc.), based on the performance power management policy being used by the system. Steps 610 through 690 of FIG. 6 operate to adjust the frequency ranges for partitions based on the system's performance power management policy.

At step 620, the first/next partition is selected from partition data store 550. At step 630, the hypervisor gathers the frequency metrics from memory 615 that resulted when the nodes were executing the selected partition. A determination is made as to whether the selected partition is being executed by multiple nodes (decision 640). If the partition is contained within a single node (is not a node-spanning partition), then decision 640 branches to "no" branch 645 whereupon processing of the partition ends because the frequency range is the full frequency spectrum of the processing core, as previously described. Processing would then loop back to step 620 to select the next partition from partition data store 550.

On the other hand, if the selected partition is being executed by multiple nodes, then decision 640 branches to "yes" branch 655 whereupon a determination is made as to whether a maximum performance power management policy is being utilized by the system (decision 660). A maximum performance power management policy strives to maximize performance on the system by increasing frequencies more readily while decreasing frequencies only when all of the nodes running the partition are running at the minimum frequency in the range.

If the maximum performance power management policy is being used, then decision 660 branches to "yes" branch 662 whereupon, a determination is made as to whether any node that is running the selected partition hit the maximum frequency in the allowed frequency range (decision 665). If any of the nodes hit the maximum frequency in the range while executing the partition, then decision 665 branches to "yes" branch 668 whereupon, at step 670, the frequency range used by the nodes when executing the selected partition is increased. Using the example introduced in FIG. 3, if the system is using the maximum performance power management policy and Partition 1 (which is being executed by Nodes A, B, and C) is set to a base frequency of 3.2 GHz with a 10% allowed frequency range based on a nominal 4.0 GHz (0.4 GHz range), then the nodes can set the processing cores from 3.2 GHz to 3.6 GHz. If any of the nodes reaches the maximum frequency in the range (3.6 GHz), then the maximum performance power management policy would increase the frequency range (e.g., bump the base frequency to 3.4 GHz so that the increased frequency range is now 3.4 GHz to 3.8 GHz). After the frequency range is increased, processing loops back to step 620 to select and process the next partition.

Returning to decision 665, if no node hit the maximum frequency in the allowed range, then decision 665 branches to "no" branch 672 whereupon a determination is made as to whether all the nodes that are running the selected partition hit the minimum frequency (decision 675). If all of the nodes running the selected partition hit the minimum frequency, then decision 675 branches to "yes" branch 676 whereupon, at step 678, the frequency range used by the nodes when executing the selected partition is decreased. Again, using the example from above, if both nodes running Partition 2 (Nodes C and D) hit the minimum frequency while executing Partition 2, then the frequency range would be decreased. If the initial frequency range was 3.2 to 3.6 GHz, then the range is decreased (e.g., to a range of 3.0 to 3.4 GHz.). After the frequency range is decreased, processing loops back to step 620 to select and process the next partition.

Returning to decision 675, if no node hit the maximum frequency in the range and all the nodes did not hit the minimum frequency in the range, then decision 675 branches to "no" branch 679 whereupon, at step 680, the frequency range of allowed by the nodes is left alone (not changed) when executing the selected partition.

Returning now to decision 660, if the maximum performance power management policy is not being used, then decision 660 branches to "no" branch 682 whereupon a determination is made as to whether is made as to whether the nodes hit the maximum frequency in the range more often than they hit the minimum frequency in the range while executing the partition (decision 685). Using this alternative performance power management policy, if the nodes hit the maximum frequency in the range more often than they hit the minimum frequency in the range while executing the partition, then decision 685 branches to "yes" branch 688 whereupon, at step 690, the frequency range used by the nodes when executing the selected partition is increased. On the other hand, if the nodes hit the minimum frequency in the range more often than they hit the maximum frequency in the range while executing the partition, then decision 685 branches to "no" branch 692 whereupon, at step 695, the frequency range used by the nodes when executing the selected partition is decreased. After the frequency range has been increased or decreased, processing loops back to step 620 to select and process the next partition.

The performance policies described above can be expanded or adjusted in order to address particular system requirements or goals. In addition to the two performance policy embodiments described above, in one embodiment, the nodes provide two frequency variables to the hypervisor—the "Fact" which is the average actual frequency that the core used during the last interval of time, and the "Fwish" with is the average frequency that the node desired to be operated at during the last interval of time. In these further embodiments, the hypervisor analyzes the Fact and Fwish and, based on these values received from each node, it selects an Ftarget (frequency target). This Ftarget is what the hypervisor will use to determine whether to move the frequency (FMIN/FMAX) range up, down, directly to the target, or to keep the same frequency. The hypervisor ensures that the minimum and maximum frequencies are within a particular range (e.g., makes a step of 5% up or down). That is if the current frequency range is 3600 MHz-4000 MHz and the Ftarget for hypervisor is 3000 MHz based on votes from all nodes. The hypervisor sends a command to all nodes with a new frequency (FMIN/FMAX) range of 3400-3800. The hypervisor will then retrieve all votes from the nodes, re-calculate a new Ftarget, and make another frequency (FMIN/FMAX) range determination to send to all of the nodes. Using these additional performance policy embodiments, several run time algorithms can be used.

In one additional embodiment, a "nominal mode" is used so that the nodes will be voting with Fact=Fwish=Fnominal unless it must enforce a power cap or thermal limit in which case Fact will change to whatever was required. Hypervisor should immediately drop all other nodes to new frequency. The hypervisor should use the lowest Fwish request as its set point for the frequency (FMIN/FMAX) range when Fact for all nodes is within the current frequency (FMIN/FMAX) range. Since the nodes will have an Fwish of nominal when in nominal mode, the system should naturally go back up to nominal as long as no power or thermal issues require a lower frequency.

In a further "static power save mode," the nodes will have a vote where Fwish=Fstatic power save. Once the frequency (FMIN/FMAX) range gets within the static power save frequency range, Fwish=Fact=Fstatic power save. The hypervisor does not need to specifically know about static power save other then that it should follow the nominal algorithm which is to follow the lowest Fwish request. There are still situations where Fact may show up outside of the frequency (FMIN/FMAX) range for power or thermal reasons in which case the nominal algorithm should be followed.

In yet a further "dynamic power save mode," embodiment, for the thermal or power reasons, Fact can at any point come in outside of the frequency (FMIN/FMAX) range at which point hypervisor should follow the nominal policy of immediately setting the frequency range to contain the Fact. After that it could begin running a modes algorithm. A node is focusing on saving power in this mode so its votes will correspond to this desire. In order to reach the performance floor targets in this mode, hypervisor should take the highest vote to determine Ftarget. Pseudocode to implement this mode is as follows:

```
for(i=0;i<num_nodes;i++)
{
    if(Fact[i] < FMIN)
    {
        // A node had to break the FMIN design due to power or thermal reasons
        // so immediately drop all nodes to new range
        FMIN = Fact[i] – 5%;
        FMAX = Fact[i] + 5%;
        i=0;
        break;
    }
    if(Fact[i] > FMAX)
    {
        // node should never have an Fact greater then FMAX,
        // hypervisor Logs Error
        // Go to the Fact
        FMIN = Fact[i] – 5%;
        FMAX = Fact[i] + 5%;
        i=0;
        break;
    }
    if(Fwish[i] > Ftarget)
        Ftarget = Fwish
}
// If we didn't have an Fact outside of the frequency range determine
// which way to step
if(i != 0)
{
    if(Ftarget < FMIN)
    {
        FMIN = FMIN – 5%;
        FMAX = FMAX – 5%;
    }
    else if(Ftarget > FMAX)
    {
```

-continued

```
        FMIN = FMIN + 5%;
        FMAX = FMAX + 5%;
    }
    else
    {
        // Leave frequency range as-is
    }
}
// Send new frequency range to each node
```

Finally, in an additional embodiment of a "dynamic power save mode—max performance," the highest Fwish from the nodes is used. Pseudocode outlining the algorithm to implement this mode is as follows:

```
for(i=0;i<num_nodes;i++)
{
    if(Fact[i] < FMIN)
    {
        // A node had to break the FMIN design due to power or
        thermal reasons
        // so immediately drop all nodes to new range
        FMIN = Fact[i] - 5%;
        FMAX = Fact[i] + 5%;
        i=0;
        break;
    }
    if(Fact[i] > FMAX)
    {
        // node should never have an Fact greater then FMAX,
        // hypervisor Logs Error
        // Go to the Fact
        FMIN = Fact[i] - 5%;
        FMAX = Fact[i] + 5%;
        i=0;
        break;
    }
    if(Fwish[i] > Ftarget)
        Ftarget = Fwish
}
// If we didn't have an Fact outside of the frequency range determine
// which way to step
if(i != 0)
{
    if(Ftarget < FMIN)
    {
        FMIN = FMIN - 5%;
        FMAX = FMAX - 5%;
    }
    else if(Ftarget > FMAX)
    {
        FMIN = FMIN + 5%;
        FMAX = FMAX + 5%;
    }
    else
    {
        // Leave frequency range as-is
    }
}
// Send new frequency range to each node
```

Figure 7:
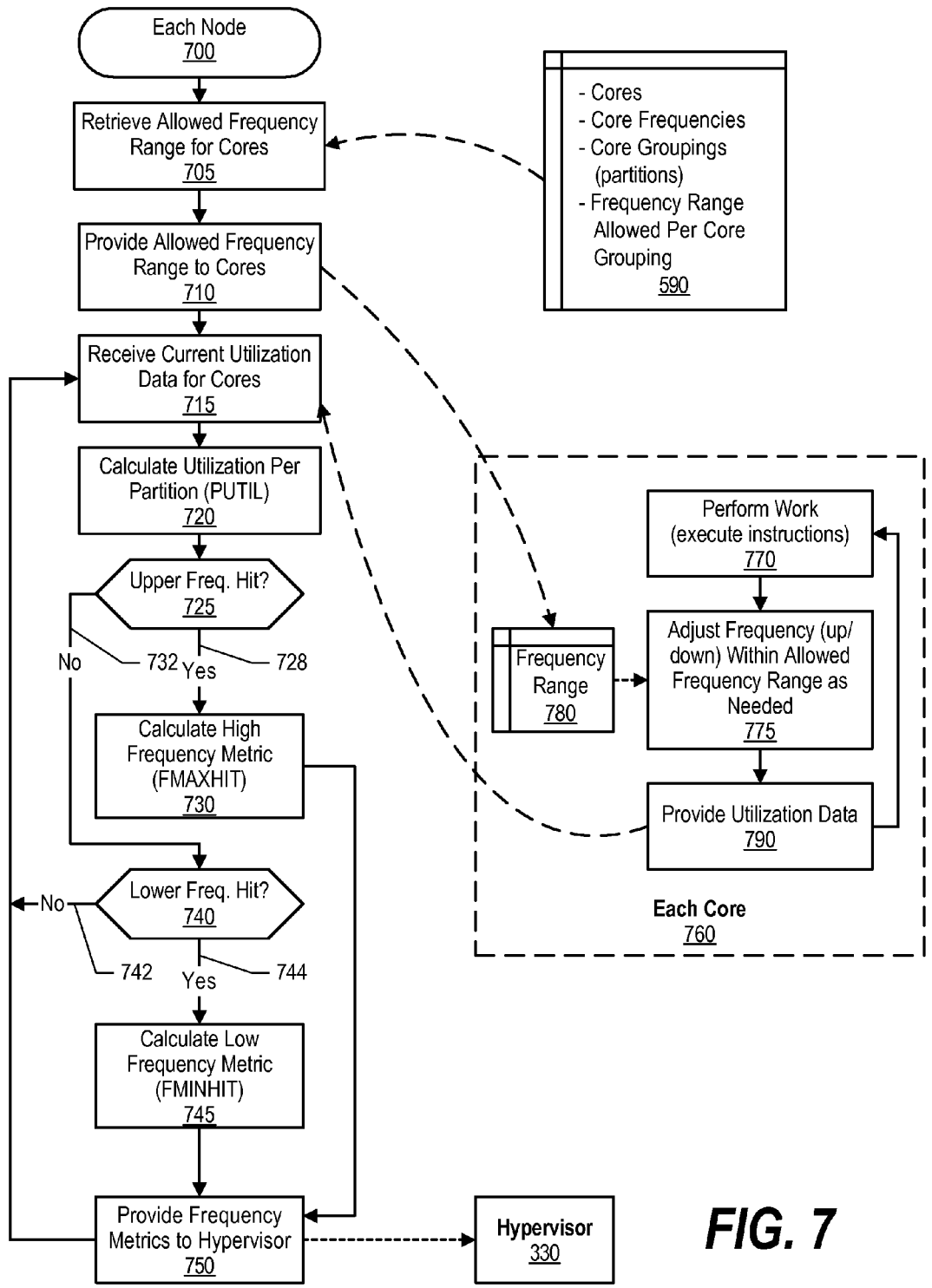
FIG. 7 is a flowchart showing steps taken by each node in the information handling system to adjust core frequencies based on the ranges provided by the hypervisor.

FIG. 7 is a flowchart showing steps taken by each node in the information handling system to adjust core frequencies based on the ranges provided by the hypervisor. Processing commences at 700 whereupon, at step 705, each node retrieves the frequency range allowed for their cores when executing a particular partition. The node determines which cores are executing the partition and, at step 710, provides these cores with the frequency range that was provided to the node by the hypervisor. At step 715, the node receives the current utilization from the processing cores. At step 720, the node calculates the utilization for each partition that is running on any of the node's processing cores. A determination is made, for each of the partitions running on the node, as to whether any of the cores executing a given partition hit the maximum allowed frequency in the frequency range provided for the partition (decision 725). If the maximum allowed frequency in the frequency range was reached for a given partition, then a maximum frequency metric (FMAXHIT) is calculated at step 730. At step 750, the node provides the frequency metrics to hypervisor 330. Processing then loops back to receive another set of current utilization data for the various cores that are running partitions. In one embodiment, the node waits for a short period of time before receiving the next set of current utilization data.

Returning to decision 725, if none of the cores running a given partition reached the maximum frequency in the range set for the partition, then decision 725 branches to "no" branch 732 bypassing step 730. A determination is made as to whether, for each of the partitions running on the node, as to whether any of the cores executing a given partition hit the minimum allowed frequency in the frequency range provided for the partition (decision 740). If the minimum allowed frequency in the frequency range was reached for a given partition, then a minimum frequency metric (FMINHIT) is calculated at step 745. At step 750, the node provides the frequency metrics to hypervisor 330. Processing then loops back to receive another set of current utilization data for the various cores that are running partitions.

Returning to decision 740, if none of the cores running a given partition reached the minimum or maximum frequency in the range set for the partition, then decision 740 branches to "no" branch 742 whereupon processing loops back to receive another set of current utilization data for the various cores that are running partitions.

Turning now to processing performed by each core included in the node (760), the allowed frequency range is provided by the node and stored in memory area 780. Each node includes memory area 780 where the allowed frequency range for the node is stored. At step 770, the processing node performs work by executing instructions (e.g., instructions used to execute a particular partition). At step 775, the processing core adjusts its frequency based on a variety of factors such as environmental (e.g., heat, etc.) factors, as well as computational factors related to the work being performed. The core can adjust its frequency within the frequency range provided by the node. For example, if the core is executing a partition with a frequency range of 3.2 GHz to 3.6 GHz, than this frequency range is provided by the node to the core and stored in memory 780. The core is now able to adjust its frequency as needed based on conditions being experienced from 3.2 GHz as the minimum frequency to a maximum frequency of 3.6 GHz. At step 790, the utilization data (e.g., frequency actually used by the processing core to perform the work, etc.) is provided back to the node. The node, as previously described, uses the utilization data received from its various cores to calculate the utilization per partition, calculate frequency metrics, and provide frequency metrics back to the hypervisor.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
   providing a first frequency range to each of a plurality of processing cores, wherein the first frequency range indicates a plurality of first frequency value limits including a first minimum frequency value and a first maximum frequency value;
   identifying one or more of the plurality of processing cores that reach at least one of the plurality of first frequency value limits in response to analyzing frequency metrics retrieved from one or more of the plurality of processing cores; and
   providing a second frequency range to each of the plurality of processing cores in response to the identification of one or more of the plurality of processing cores reaching at least one of the plurality of first frequency value limits, wherein the second frequency range indicates a second maximum frequency value and a second minimum frequency value, and wherein the second maximum frequency value is different than the first maximum frequency value and the second minimum frequency value is different than the first minimum frequency value.

2. The method of claim 1 wherein the analyzing further comprises:
   increasing the first frequency range in response to at least one of the processing cores reaching the first maximum frequency value, wherein the increase results in the second frequency range; and
   decreasing the first frequency range in response to at least one of the processing cores reaching the first minimum frequency value, wherein the decrease results in the second frequency range.

3. The method of claim 1 wherein the analyzing further comprises:
   first counting a number of processing cores that reached the first maximum frequency value, the first counting resulting in a maximum frequency count;
   second counting a number of processing cores that reached the first minimum frequency value, the second counting resulting in a minimum frequency count;
   increasing the first frequency range in response to the maximum frequency count being greater than the minimum frequency count, wherein the increase results in the second frequency range; and
   decreasing the first frequency range in response to the minimum frequency count being greater than the maximum frequency count, wherein the decrease results in the second frequency range.

4. The method of claim 1 wherein the plurality of processing cores are utilized by a plurality of processing nodes to execute a software partition.

5. The method of claim 4 further comprising:
   executing a plurality of nodal-spanning partitions, including the software partition, on the plurality of processing nodes and plurality of processing cores, wherein each of the nodal-spanning partitions span the plurality of the processing nodes when executed;
   identifying a plurality of frequency ranges, including the first frequency range and the second frequency range, wherein each of the plurality of frequency ranges corresponds to one of the plurality of partitions;
   selecting one of the nodal-spanning partitions for execution on a selected plurality of processing nodes and a selected plurality of processing cores included in the selected processing nodes;
   selecting one of the frequency ranges from the plurality of frequency ranges, wherein the selected frequency range corresponds to the selected nodal-spanning partition; and
   setting, by each of the processing cores when executing the selected nodal-spanning partition, the core's frequency within the selected frequency range.

6. The method of claim 5 further comprising:
   identifying the selected plurality of processing nodes and the selected plurality of processing cores; and
   identifying, a plurality of initial frequency ranges to use for the plurality of nodal-spanning partitions, wherein each of the initial frequency ranges identifies an initial maximum frequency and an initial minimum frequency, wherein the difference between the initial maximum frequency and the initial minimum frequency is a range value, and wherein a plurality of range values exist and each range value corresponds to one of the partitions.

7. An information handling system comprising:
   one or more processors;
   a plurality of processing cores included in the one or more processors;
   a memory accessible by one or more of the processors; and
   a set of instructions executed by one or more of the processors in order to perform actions of:
      providing a first frequency range to each of the plurality of processing cores, wherein the first frequency range indicates a plurality of first frequency value limits including a first minimum frequency value and a first maximum frequency value;
      identifying one or more of the plurality of processing cores that reach at least one of the plurality of first frequency value limits in response to analyzing frequency metrics retrieved from one or more of the plurality of processing cores; and providing a second frequency range to each of the plurality of processing cores in response to the identification of one or more of the plurality of processing cores reaching at least one of the plurality of first frequency value limits, wherein the second frequency range indicates a second maximum frequency value and a second minimum frequency value, and wherein the second maximum frequency value is different than the first maximum frequency value and the second minimum frequency value is different than the first minimum frequency value.

8. The information handling system of claim 7 wherein the set of instructions perform additional actions of:

increasing the first frequency range in response to at least one of the processing cores reaching the first maximum frequency value, wherein the increase results in the second frequency range; and decreasing the first frequency range in response to at least one of the processing cores reaching the first minimum frequency value, wherein the decrease results in the second frequency range.

9. The information handling system of claim 7 wherein the set of instructions perform additional actions of:

first counting a number of processing cores that reached the first maximum frequency value, the first counting resulting in a maximum frequency count;

second counting a number of processing cores that reached the first minimum frequency value, the second counting resulting in a minimum frequency count;

increasing the first frequency range in response to the maximum frequency count being greater than the minimum frequency count, wherein the increase results in the second frequency range; and decreasing the first frequency range in response to the minimum frequency count being greater than the maximum frequency count, wherein the decrease results in the second frequency range.

10. The information handling system of claim 7 wherein the plurality of processing cores are utilized by the plurality of processing nodes to execute a software partition.

11. The information handling system of claim 10 wherein the set of instructions perform additional actions of:

executing a plurality of nodal-spanning partitions, including the software partition, on the plurality of processing nodes and plurality of processing cores, wherein each of the nodal-spanning partitions span the plurality of the processing nodes when executed;

identifying a plurality of frequency ranges, including the first frequency range and the second frequency range, wherein each of the plurality of frequency ranges corresponds to one of the plurality of partitions;

selecting one of the nodal-spanning partitions for execution on a selected plurality of processing nodes and a selected plurality of processing cores included in the selected processing nodes;

selecting one of the frequency ranges from the plurality of frequency ranges, wherein the selected frequency range corresponds to the selected nodal-spanning partition; and setting, by each of the processing cores when executing the selected nodal-spanning partition, the core's frequency within the selected frequency range.

12. The information handling system of claim 10 wherein the set of instructions perform additional actions of:

identifying the selected plurality of processing nodes and the selected plurality of processing cores; and identifying, a plurality of initial frequency ranges to use for the plurality of nodal-spanning partitions, wherein each of the initial frequency ranges identifies an initial maximum frequency and an initial minimum frequency, wherein the difference between the initial maximum frequency and the initial minimum frequency is a range value, and wherein a plurality of range values exist and each range value corresponds to one of the partitions.

13. A computer program product stored in a computer storage medium, comprising functional descriptive material that, when executed by an information handling system, causes the information handling system to perform actions that include:

providing a first frequency range to each of a plurality of processing cores, wherein the first frequency range indicates a plurality of first frequency value limits including a first minimum frequency value and a first maximum frequency value;

identifying one or more of the plurality of processing cores that reach at least one of the plurality of first frequency value limits in response to analyzing frequency metrics retrieved from one or more of the plurality of processing cores; and providing a second frequency range to each of the plurality of processing cores in response to the identification of one or more of the plurality of processing cores reaching at least one of the plurality of first frequency value limits, wherein the second frequency range indicates a second maximum frequency value and a second minimum frequency value, and wherein the second maximum frequency value is different than the first maximum frequency value and the second minimum frequency value is different than the first minimum frequency value.

14. The computer program product of claim 13 wherein the functional descriptive material, when executed by the information handling system, causes the information handling system to perform additional actions that include:

increasing the first frequency range in response to at least one of the processing cores reaching the first maximum frequency value, wherein the increase results in the second frequency range; and decreasing the first frequency range in response to at least one of the processing cores reaching the first minimum frequency value, wherein the decrease results in the second frequency range.

15. The computer program product of claim 13 wherein the functional descriptive material, when executed by the information handling system, causes the information handling system to perform additional actions that include:

first counting a number of processing cores that reached the first maximum frequency value, the first counting resulting in a maximum frequency count;

second counting a number of processing cores that reached the first minimum frequency value, the second counting resulting in a minimum frequency count;

increasing the first frequency range in response to the maximum frequency count being greater than the minimum frequency count, wherein the increase results in the second frequency range; and decreasing the first frequency range in response to the minimum frequency count being greater than the maximum frequency count, wherein the decrease results in the second frequency range.

16. The computer program product of claim 13 wherein the plurality of processing cores are utilized by a plurality of processing nodes to execute a software partition, and wherein the functional descriptive material, when executed by the information handling system, causes the information handling system to perform additional actions that include:
- executing a plurality of nodal-spanning partitions, including the software partition, on the plurality of processing nodes and plurality of processing cores, wherein each of the nodal-spanning partitions span the plurality of the processing nodes when executed;
- identifying a plurality of frequency ranges, including the first frequency range and the second frequency range, wherein each of the plurality of frequency ranges corresponds to one of the plurality of partitions;
- selecting one of the nodal-spanning partitions for execution on a selected plurality of processing nodes and a selected plurality of processing cores included in the selected processing nodes;
- selecting one of the frequency ranges from the plurality of frequency ranges, wherein the selected frequency range corresponds to the selected nodal-spanning partition; and
- setting, by each of the processing cores when executing the selected nodal-spanning partition, the core's frequency within the selected frequency range.

17. The computer program product of claim 16 wherein the plurality of processing cores are utilized by a plurality of processing nodes to execute a software partition, and wherein the functional descriptive material, when executed by the information handling system, causes the information handling system to perform additional actions that include:
- identifying the selected plurality of processing nodes and the selected plurality of processing cores; and
- identifying, a plurality of initial frequency ranges to use for the plurality of nodal-spanning partitions, wherein each of the initial frequency ranges identifies an initial maximum frequency and an initial minimum frequency, wherein the difference between the initial maximum frequency and the initial minimum frequency is a range value, and wherein a plurality of range values exist and each range value corresponds to one of the partitions.

* * * * *